United States Patent
Duan et al.

(10) Patent No.: US 8,834,607 B2
(45) Date of Patent: Sep. 16, 2014

(54) REMOVAL OF KRYPTON AND XENON IMPURITIES FROM ARGON BY MOF ADSORBENT

(75) Inventors: Yanyu Duan, Bear, DE (US); Tracey Jacksier, Landenberg, PA (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 13/504,508

(22) PCT Filed: Oct. 29, 2010

(86) PCT No.: PCT/US2010/054794
§ 371 (c)(1),
(2), (4) Date: Apr. 27, 2012

(87) PCT Pub. No.: WO2011/053820
PCT Pub. Date: May 5, 2011

(65) Prior Publication Data
US 2012/0210872 A1    Aug. 23, 2012

Related U.S. Application Data

(60) Provisional application No. 61/256,597, filed on Oct. 30, 2009.

(51) Int. Cl.
*B01D 53/02* (2006.01)
*B01J 20/34* (2006.01)
*B01J 20/22* (2006.01)
*C01B 23/00* (2006.01)

(52) U.S. Cl.
CPC .............. *B01J 20/22* (2013.01); *B01J 20/3458* (2013.01); *B01J 20/34* (2013.01); *B01J 2220/62* (2013.01); *C01B 2210/0084* (2013.01); *B01J 20/226* (2013.01); *C01B 2210/0034* (2013.01); *C01B 23/0073* (2013.01); *C01B 23/0057* (2013.01); *C01B 2210/0085* (2013.01)
USPC ........................................................... 95/127

(58) Field of Classification Search
USPC ........................................................... 95/127
See application file for complete search history.

(56) References Cited

FOREIGN PATENT DOCUMENTS
WO    WO 2006/072573    7/2006

OTHER PUBLICATIONS

Ashleigh J. Fletcher, K. Mark Thomas and Matthew J. Rosseinsky, "Flexibility in Metal-Organic Framework Materials; Impact on Sorption Properties," Journal of Solid State Chemistry, 178 (2005) 2491-2510.
Ryan D. Kuppler, Daren J. Timmons, Qian-Rong Fang, Jian-Rong Li, Trevor A. Makal, Mark D. Young, Daqiang Yuan, Dan Zhao, Wenjuan Zhuang and Hong-Cai Zhou, "Potential Applications of Metal-Organic Frameworks," Coordination Chemistry Reviews (2008).
Jefferey A. Greathouse, Tiffany L. Kinnibrugh and Mark D. Allendorf, "Adsorption and Separation of Noble Gases by IRMOF-1: Grand Canonical Monte Carlo Simulations," Ind. Eng. Chem. Res. 2009, 48, 3425-3431.
Jefferey A. Greathouse, Mark D. Allendorf and Joseph C. Sanders, "Computational Investigation of Noble Gas Adsorption and Separation by Nanoporous Materials," Sandia Corporation (Oct. 2008).
Patrick Ryan, Omark K. Farha, Linda J. Broadebelt and Randall Q. Snurr, "Computational Screening of Metal-Organic Frameworks for Xenon/Krypton Separation," AIChE Journal, vol. 57, No. 7, 1759-1766 (Jul. 2011).
PCT/US2010/054794, International Search Report and Written Opinion, Jan. 20, 2011.

*Primary Examiner* — Christopher P Jones
(74) *Attorney, Agent, or Firm* — Allen E. White; Patricia E. McQueeney (57) ABSTRACT

Disclosed is a system and method for removing trace levels of krypton and xenon from argon by using metal organic framework (MOF) adsorbents.

7 Claims, 6 Drawing Sheets

REMOVAL OF KRYPTON AND XENON IMPURITIES FROM ARGON BY MOF ADSORBENT

CROSS-REFERENCE TO RELATED APPLICATIONS

This application is a §371 of International PCT Application PCT/US2010/054794, filed Oct. 29, 2010, which claims priority to U.S. Provisional Application No. 61/256,597, filed Oct. 30, 2009, the entire contents of which are incorporated herein by reference.

BACKGROUND

Inductively coupled plasma-mass spectroscopy (ICP-MS) is currently used in at least the electronics, environmental, geological, and medical fields. The plasma used in ICP-MS is generated by ionizing argon gas. Typically, argon having a purity of 99.9% or higher is used in ICP-MS. Sigma Aldrich sells argon at purities of at least 99.998% and at least 99.995%. As a result, these products are capable of containing up to 20 and up to 50 ppm impurities respectively. These impurities may include, but are not limited to, krypton, xenon, carbon dioxide, nitrogen, oxygen, etc.

Interference from small amounts of krypton and xenon in the argon gas may result in inaccuracy of certain elemental analysis, such as strontium, selenium, and rubidium. To provide more accurate results, higher purity argon is required. However, to produce higher purity argon and to remove the krypton and xenon impurities, air separation units must be operated in a non-optimized way, thereby dramatically increasing costs. At this time, it does not appear that the other impurities contained in the argon gas affect the accuracy of the ICP-MS test results.

Metal organic frameworks (MOFs) are porous materials formed by bonds between metal centers and organic multidentate ligands. The porous materials provide large surface area and uniform pores having small dimensions. The pore sizes may be tailored by selection of the metals and ligands. Kuppler et al., *Potential Applications of Metal-Organic Frameworks*, Coordination Chemistry Reviews (2008). The potential uses of MOFs include, but are not limited to, hydrogen storage, gas separation and purification, catalysts, and sensors. However, the materials are more flexible than classical adsorbents, such as activated carbon and molecular sieves, resulting in lower thermal and chemical stability. Fletcher et al., *Flexibility in Metal-Organic Framework Materials: Impact on Sorption Properties*, Journal of Solid State Chemistry, 178 (2005) 2491-2510. Currently, thousands of MOFs have been discovered, but only a couple handfuls are commercially available: iron 1,3,5-benzenetricarboxylate, 2-methylimidazole zinc salt, aluminum terephthalate, and copper benzene-1,3,5-tricarboxylate.

Iron 1,3,5-benzenetricarboxylate (Fe-BTC or $Fe_3(BTC)_2$) is commercially available as Basolite™ F 300 from BASF. Fe-BTC is green and has a bulk density of 0.16-0.35 $g/cm^3$, BET surface area of 1300-1600 $m^2/g$, and pore sizes of 0.55 nm and 0.86 nm.

2-methylimidazole zinc salt (ZIF 8 or MOF-1 or MOF-5) is commercially available as Basolite™ Z 1200 from BASF. ZIF 8 is light blue and has a bulk density of 0.35 $g/cm^3$, BET surface area of 1300-1800 $m^2/g$, and pore size of 0.6 nm.

Aluminum terephthalate (MIL 53) is commercially available as Basolite™ A 100 from BASF. MIL 53 is grey and has a bulk density of 0.4 $g/cm^3$, BET surface area of 1100-1500 $m^2/g$, and pore size of 0.85 nm.

Figure 1:
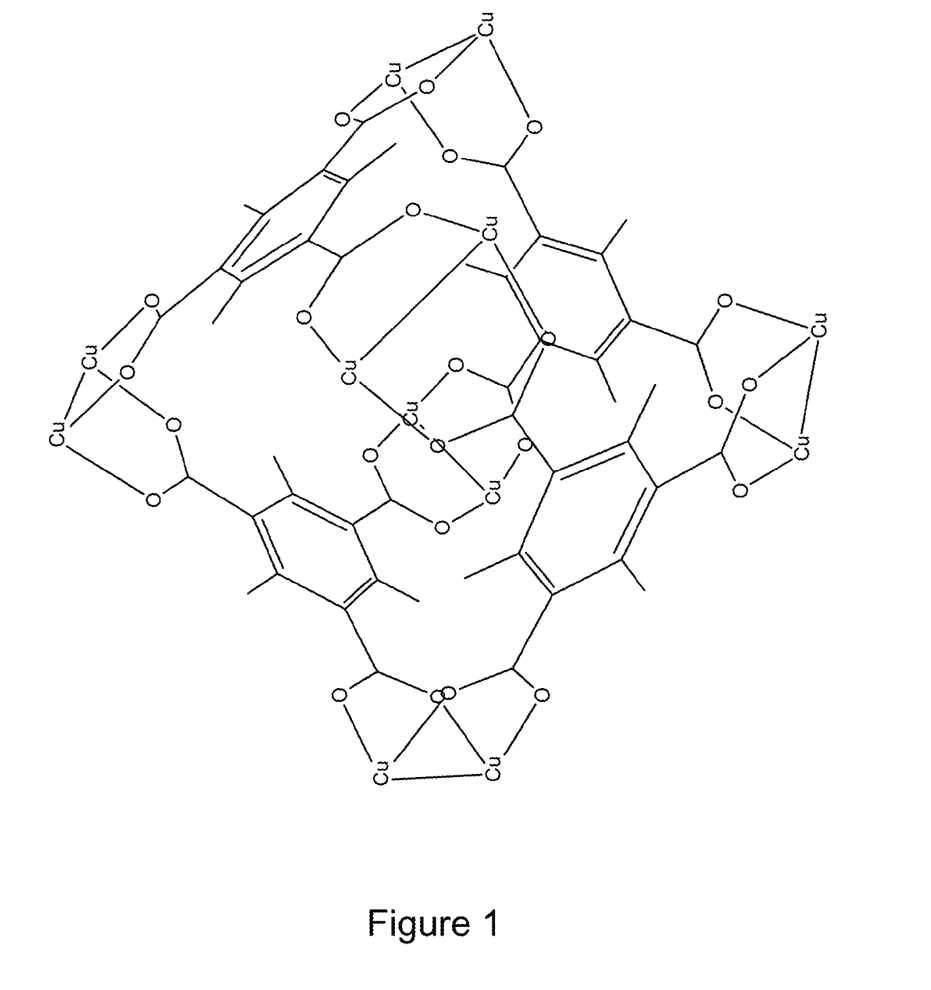
FIG. 1 is a graphical representation of $Cu_3BTC_2$.

Copper benzene-1,3,5-tricarboxylate (Cu-BTC or $Cu_3(BTC)_2$ or HKUST-1) is a widely studied MOF and is commercially available as Basolite™ C 300 from BASF. Cu-BTC is blue and has a bulk density of 0.35 $g/cm^3$, BET surface area of 1500-2100 $m^2/g$, and pore sizes of 0.5 nm and 0.9 nm. Cu-BTC also has a particle size distribution 15.96 um (D50). The pore network of Cu-BTC has a simple cubic symmetry and two kinds of pores with smaller sizes. The crystal structure of Cu-BTC is reported to be composed of Cue $(COO)_4$ paddle wheels with copper dimers as four connectors and benzene-1,3,5-tricarboxylate (BTC) as three connectors, forming a three-dimensional network with main channels of a square cross-section of ca. 0.9 nm diameter and tetrahedral side pockets of ca. 0.5 nm, which are connected to the main channels by triangular windows of ca. 0.35 nm diameter, as shown in FIG. 1. These characteristics have attracted much attention for gas separation, adsorption, sensors, and catalysts.

Sandia National Laboratories issued a report in October, 2008, entitled Computational Investigation of Noble Gas Adsorption and Separation by Nanoporous Materials. Based on molecular simulations, the report indicates that a copper-based MOF, Cu-BTC, selectively adsorbs xenon and krypton atoms when present in trace amounts in atmospheric air samples (79.7 nitrogen/20.0% oxygen).

While MOFs have been proposed for a variety of uses, there still exists a need to be able to separate small quantities of krypton and xenon from argon.

SUMMARY

Disclosed is a method of removing krypton and/or xenon impurities from an argon gaseous mixture. The method includes the steps of: obtaining an argon gaseous mixture containing argon and impurities of krypton and/or xenon; flowing the mixture through a cartridge containing one or more metal organic framework (MOF) adsorbents; and producing purified argon from the cartridge. The method may include one or more of the following aspects:

the step of activating the one or more MOF adsorbents;
wherein the mixture contains a concentration of krypton ranging from approximately 1 ppm v/v to approximately 0.5% w/w;
wherein the mixture has a xenon concentration of 1-5,000 ppm v/v;
wherein the mixture has a krypton concentration of 1-10 ppm v/v and/or a xenon concentration of 1-10 ppm v/v;
wherein the one or more MOF adsorbents is $Cu_3(BTC)_2$, where BTC is benzene-1,3,5-tricarboxylate;
wherein the purified argon produced contains between about 0 ppm to about 0.5 ppm v/v krypton and/or between about 0 ppm to about 0.25 ppm v/v xenon;
wherein the step of flowing the mixture through the cartridge is performed at a temperature in the range of about −200° C. to about 25° C.;
wherein the step of flowing the mixture through the cartridge is performed at a temperature about 22° C.;
wherein the step of flowing the mixture through the cartridge is performed at a temperature about −26° C.;
wherein the mixture contains approximately 1 ppm krypton v/v and/or approximately 1 ppm xenon v/v;
wherein the step of flowing the mixture through the cartridge is performed at a pressure between about 50 psi to about 400 psi;
wherein the step of flowing the mixture through the cartridge is performed at a pressure of about 100 psi;

wherein the argon gaseous mixture flows through the cartridge at a flow rate of about 100-50,000 mL/minute;

wherein the argon gaseous mixture flows through the cartridge at a flow rate of about 500 mL per minute;

further comprising the step of regenerating the $Cu_3(BTC)_2$ after approximately 1 hour of mixture flow;

the step of regenerating is performed by flowing nitrogen through the cartridge at a temperature in the range of about 100° C. to about 350° C.

Also disclosed is an argon purification system comprising: a source of argon gaseous mixture comprising at least 99% v/v argon and impurities of krypton and/or xenon; a cartridge having an inlet and an outlet, the cartridge inlet being in fluid communication with the source, the cartridge containing one or more metal organic framework (MOF) adsorbents, the inlet adapted to receive a mixture containing argon and impurities of krypton and/or xenon, the outlet being adapted to supply purified argon gas; and an argon consumption device having an inlet in fluid communication with the cartridge outlet. The argon purification system may include one or more of the following aspects:

the one or more MOF adsorbents is $Cu_3(BTC)_2$ where BTC is benzene 1,3,5-tricarboxylate;

the cartridge is made of stainless steel;

the system further comprises a jacket surrounding the cartridge and in which a refrigerant circulates; and/or the system further comprises a canister in fluid communication with the cartridge and which is adapted to receive and store the purified argon from the outlet of the cartridge the argon consumption device is an inductively coupled plasma mass spectrometer.

Notation and Nomenclature

The following abbreviated terms are used throughout the description and claims:

As used herein, the abbreviation "ICP-MS" refers to inductively coupled plasma-mass spectroscopy; the abbreviation "MOF" refers to metal organic framework; the abbreviation "MIL 53" refers to the metal organic framework material aluminum terephthalate, and preferably refers to Basolite™ A 100 from BASF; the abbreviation "$Cu_3BTC_2$" refers to the metal organic framework material copper benzene-1,3,5-tricarboxylate, and preferably refers to Basolite™ C 300 from BASF; the abbreviation "ppm" refers to parts per million; the abbreviation "GC" refers to gas chromatograph; and the abbreviation "PDHID" refers to pulsed discharge helium ionization detector.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Disclosed is a system and method for removing trace levels of krypton and/or xenon from a gaseous mixture containing argon and impurities of krypton and/or xenon by using metal organic framework (MOF) adsorbents. Typically, the gaseous mixture has an argon concentration of 99.5% v/v or higher, more typically 99.9% v/v or higher, even more typically 99.99% v/v or higher. The gaseous mixture may contain a concentration of krypton ranging from approximately 1 ppm v/v to approximately 5,000 ppm w/w. Alternatively, the gaseous mixture may have a xenon concentration ranging from approximately 1 ppm v/v to approximately 0.5% w/w. Typically, the gaseous mixture contains approximately 1-50 ppm v/v krypton and/or 1-50 ppm v/v xenon, more typically approximately 1-25 ppm v/v krypton and/or approximately 1-25 ppm v/v xenon. Even more typically, it contains approximately 1-10 ppm v/v krypton and/or approximately 1-10 ppm v/v xenon. The gaseous mixture may further comprise other impurities, such as carbon dioxide, oxygen, nitrogen, etc. that may or may not be removed by the MOF disclosed herein.

In the disclosed method, the gaseous mixture flows through a cartridge containing one or more MOF adsorbents. In a preferred embodiment, the MOF adsorbent is $Cu_3BTC_2$ or aluminum terephthalate, most typically $Cu_3BTC_2$. Other MOF adsorbents having size, shape, and chemical interaction parameters similar to those of $Cu_3BTC_2$ may be used in the teachings hereof. The one or more MOF adsorbents purify the gaseous mixture by adsorbing the xenon and krypton impurities. The resulting argon gas has a krypton concentration of less than or equal to 0.5 ppm v/v and/or an argon concentration of less than or equal to 0.25 ppm v/v. One of ordinary skill in the art will recognize that multiple MOF adsorbents may be combined to target removal of specific impurities for specific applications. For example, $Cu_3BTC_2$ and MIL 53 may be combined, with $Cu_3BTC_2$ targeting removal of xenon and/or krypton impurities and MIL 53 targeting removal of xenon and/or carbon dioxide.

The dimension of the cartridge, the quantity and type of MOF adsorbent, and the gaseous mixture flow rate, pressure, and temperature of the method may vary. For example, as described in more detail in the Example 1 below, 46 g of $Cu_3BTC_2$ in a 1 inch inner diameter×8 inch length cartridge removed 10 ppm of krypton and 10 ppm of xenon from 500 mL/minute of a gaseous mixture at 100 psi and at 22° C. for approximately 1.5 hours and 1.8 hours respectively and at –26° C. for approximately 1.8 hours and 24 hours respectively. In other words, 46 g of $Cu_3BTC_2$ purified 45 L of a gaseous mixture in 90 minutes at 22° C. and 54 L of a gaseous mixture in 108 minutes at –26° C. As the temperature of the $Cu_3BTC_2$ MOF is lowered from 22° C. to –26° C., its krypton capacity increased from 0.037 mg/g at to 0.044 mg/g while its xenon capacity increased from 0.069 mg/g to 0.917 mg/g.

Applicants believe that lower temperatures and higher pressures may further improve the adsorption performance of the MOF adsorbents. But, too low a flow rate results in lower partial pressures of the impurities and thus poor adsorption. On the other hand, too high a flow rate may result in equipment and/or material failure. Therefore the disclosed method may be performed at a temperature in the range of about −200° C. to about 25° C. and at a pressure between about 50 psi to about 400 psi. Additionally, the flow rate of the gaseous mixture may range from about 100 mL/minute to about 50 L/minute. One of ordinary skill in the art will recognize that different quantities of $Cu_3BTC_2$ and/or impurities and/or different operating temperatures, pressures, and/or flow rates will vary the amount of time required for argon purification.

In one simple embodiment, the cartridge is a stainless steel tube having female threading on each end. A stainless steel compression fitting is screwed onto the end of the tube. Glass wool or glass beads are inserted into the open end of the tube and compacted in a uniform manner adjacent to the fitting at the closed end of the tube. A predetermined amount of the MOF adsorbent, in pellet or powder form, is added to the tube. Glass wool or glass beads are used to pack the remainder of the tube. A second stainless steel compression fitting is screwed onto the open end of the tube.

The cartridge may be made of any material suitable for the method herein, such as but not limited to stainless steel, nickel, aluminum, metal alloys, carbon steel, and ceramics. Preferably, the cartridge is made of a material suitable to withstand the operation pressure. A 1 inch schedule 40 circular pipe material is rated to withstand 450 psi, and is therefore one preferred embodiment. Variations of this embodiment are within the skill in the art.

At a minimum, the cartridge has an inlet adapted to receive the gaseous mixture to be purified and an outlet adapted to supply the purified argon gas. The cartridge may further include a separate inlet and outlet for a purge gas. Alternatively, a purge gas may be fed through the outlet of the cartridge to the inlet. The cartridge may be designed so that it opens to allow the one or more MOF adsorbents to be placed inside the cartridge and closed in a sealable manner. This mechanism further provides the ability to activate and regenerate the one or more MOF adsorbents under vacuum without damaging the cartridge or forming channels in the one or more MOF adsorbents. The cartridge may further include a jacket which surrounds the cartridge and in which a refrigerant circulates. The refrigerant may be selected from fluids known to those skilled in the art, such as liquid nitrogen, carbon dioxide, brine, ammonia, and glycol water. The outlet of the canister may further be in fluid communication with a canister adapted to receive and store the purified argon.

Prior to purifying the gaseous mixture, the MOF adsorbent cartridge is activated by heating the cartridge and holding the heated cartridge under vacuum for a period of time. As described previously, the cartridge may preferably be opened during activation to prevent damage to the cartridge and the formation of channels in the one or more MOF adsorbents. For example, as described in more detail in the Example 1 below and as recommended by BASF, when activating approximately 46 g of $Cu_3BTC_2$, the cartridge is placed in an oven and heated from 22° C. to 200° C. at 2° C. per minute and held at 200° C. under vacuum for 16 hours. One of ordinary skill in the art will recognize that different activation parameters may be utilized to activate the cartridge. For example, activation may occur at a final temperature of about 100° C. for a longer period of time, such as 24 hours, or at about 350° C. for a short period of time, such as 8 hours. Activation may also occur at any temperature in between and for suitable periods of time. One of ordinary skill in the art will also recognize that different amounts of $Cu_3BTC_2$ may require different activation parameters.

After allowing the gaseous mixture to flow through the MOF adsorbent for a period of time (and preferably as the MOF adsorbent approaches saturation), the MOF adsorbent may be regenerated by flowing nitrogen through the cartridge at an elevated temperature. The amount of gaseous mixture flowing through, and the operating parameters of, the cartridge will determine the periods of time at which the MOF adsorbent should be regenerated. For example, as described in more detail in the Example 1 below, when purifying a gaseous mixture having argon, 10 ppm xenon, and 10 ppm krypton impurities in 46 g of $Cu_3BTC_2$ at a flow rate of 500 mL/minute, at 22° C. and 100 psi, the $Cu_3BTC_2$ may be regenerated after approximately 1.5 hours. However, when purifying the same gaseous mixture at the same conditions except that the temperature is dropped to −26° C., regeneration of the $Cu_3BTC_2$ may occur after approximately 1.8 hours. One of ordinary skill in the art will recognize that differing amounts of $Cu_3BTC_2$ and/or impurities and/or different operating temperatures, pressures, and/or flow rates will vary the amount of time required for regeneration.

The MOF adsorbent may be regenerated by flowing nitrogen through the cartridge at an elevated temperature. In one embodiment, the cartridge may be opened and placed in an oven under a nitrogen atmosphere. Alternatively and, for the reasons discussed previously, less preferably, heated nitrogen may flow from the outlet to the inlet the cartridge. For example, 46 g of $Cu_3BTC_2$ may be regenerated by flowing 500 mL/min of nitrogen through the cartridge at 200° C. for approximately 15 to approximately 24 hours. Alternatively, the temperature may range from about 100° C. to about 350° C.

After regeneration, the MOF adsorbent may be used once again to purify a gaseous mixture. Purification results similar to those described above and in Example 1 were obtained from $Cu_3BTC_2$ regenerated up to three times. As the upper limit of regeneration is not known at this time, the MOF should be monitored for a decrease in capacity during subsequent regenerations.

Examples

The following examples illustrate experiments performed in conjunction with the disclosure herein. The examples are not intended to be all inclusive and are not intended to limit the scope of the disclosure described herein or the claims appended hereto.

Example 1

A gaseous mixture containing argon, krypton, and xenon was passed through a cartridge containing 46 g of Cu-BTC to determine the breakthrough times of krypton and xenon. The breakthrough time was the amount of time it took for the krypton or xenon to elute from the stainless steel cartridge and reflects the period of time in which the Cu-BTC is no longer capable of adsorbing, or is saturated with, krypton and xenon.

The stainless steel cartridge utilized has a 1 inch inner diameter and 8 inch length. The Cu-BTC was filled in the middle of the cartridge and glass wool was stuffed in both ends. The Cu-BTC cartridge was activated by heating it in an oven from 22° C. to 200° C. at a rate of 2° C./minute and holding at 200° C. under vacuum for 16 hours.

A gaseous mixture containing argon, 10 ppm xenon, and 10 ppm krypton was fed through the cartridge at a flow rate of 500 mL/min, at 100 psi, and at either 22° C. or −26° C. As stated previously, other impurities may also be present in the gaseous mixture. Analysis of the purified argon gas was performed by a Varian CP-3800 gas chromatograph (GC) coupled with a pulse discharge helium ionization detector (PDHID). A 30 m×0.53 mm ID plot molecular sieve 5A capillary column and helium as a carrier gas at 4 mL/min were used for the GC. The oven had an initial temperature of 40° C. which was ramped to 120° C. at 25° C./min and held for 2 minutes. The PDHID was operated at 140° C. with a helium flow of 35 mL/min. Prior to the breakthrough testing, the GC/PDHID was calibrated using 10 ppm, 7.5 ppm, 5 ppm, 2.5 ppm, 1 ppm, 0.5 ppm, and 0.25 ppm xenon and krypton impurities.

Figure 2:
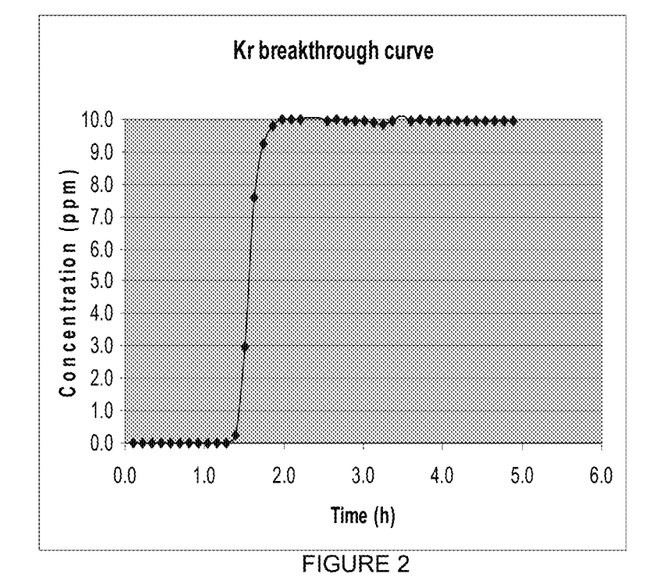
FIG. 2 is the breakthrough curve for krypton in $Cu_3BTC_2$ at room temperature.

FIG. 2 is the breakthrough curve for krypton at 22° C. The breakthrough time for krypton was 1.5 hours.

Figure 3:
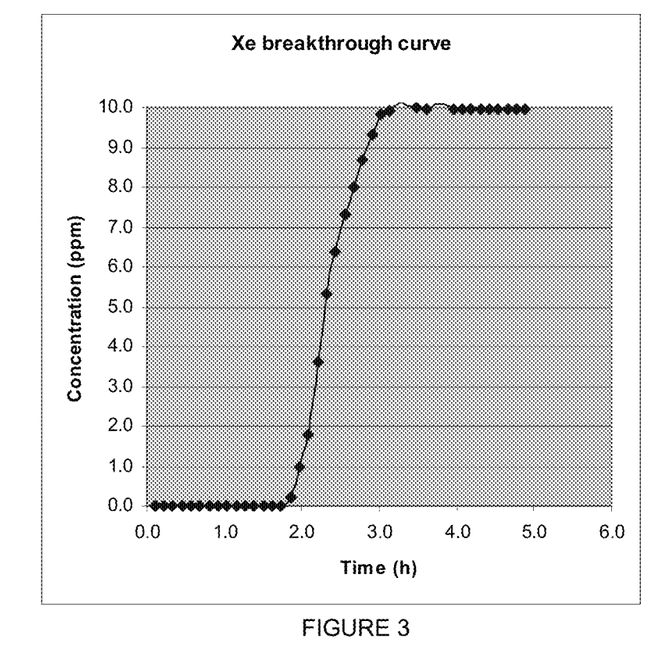
FIG. 3 is the breakthrough curve for xenon in $Cu_3BTC_2$ at room temperature.

FIG. 3 is the breakthrough curve for xenon at 22° C. The breakthrough time for xenon was 1.8 hours.

Figure 4:
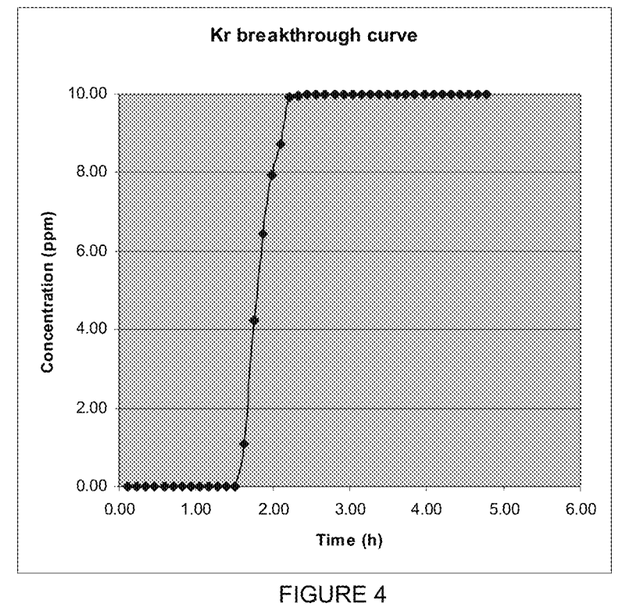
FIG. 4 is the breakthrough curve for krypton in $Cu_3BTC_2$ at –26° C.

FIG. 4 is the breakthrough curve for krypton at −26° C. The breakthrough time for krypton was 1.8 hours.

Figure 5:
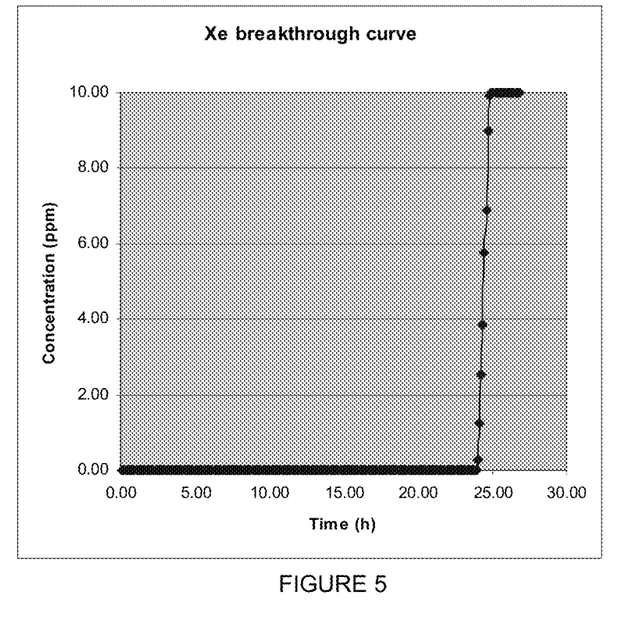
FIG. 5 is the breakthrough curve for xenon in $Cu_3BTC_2$ at –26° C.

FIG. 5 is the breakthrough curve for xenon at −26° C. The breakthrough time for xenon was 24 hours.

Based on these results, Cu-BTC adsorbs krypton and xenon better at lower temperatures.

Example 2

A gaseous mixture containing argon, krypton, and xenon was passed through a cartridge containing 46 g of MIL 53 to determine the breakthrough times of krypton and xenon.

As in Example 1, the stainless steel cartridge has a 1 inch inner diameter and 8 inch length. The MIL 53 was filled in the middle of the cartridge and glass wool was stuffed in both ends. The MIL 53 cartridge was activated by heating it in an oven from 22° C. to 200° C. at a rate of 2° C./minute and holding at 200° C. under vacuum for 16 hours.

A gaseous mixture containing argon, 10 ppm xenon, and 10 ppm krypton was fed through the cartridge at a flow rate of 500 mL/min, at 100 psi, and at either 22° C. or −26° C. As stated previously, the gaseous mixture may also contain other impurities. Analysis of the purified argon gas was performed by the same equipment detailed in Example 1.

Figure 6:
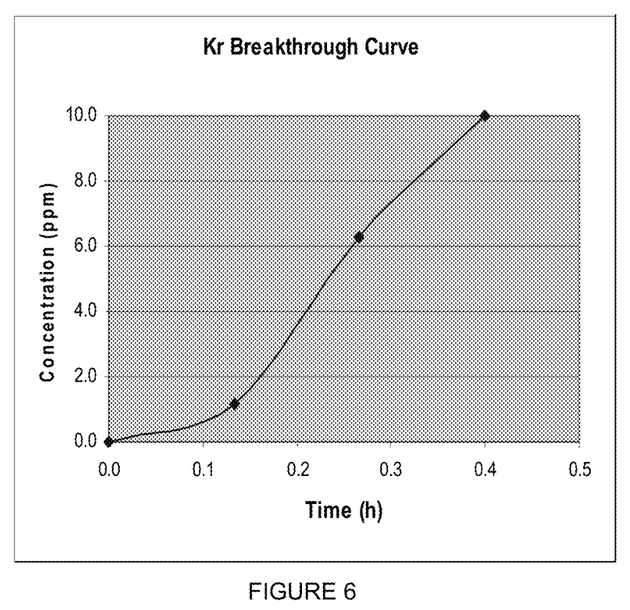
FIG. 6 is the breakthrough curve for krypton in MIL 53 at 22° C.

FIG. 6 is the breakthrough curve for krypton at 22° C. The breakthrough time for krypton was 0 hours.

Figure 7:
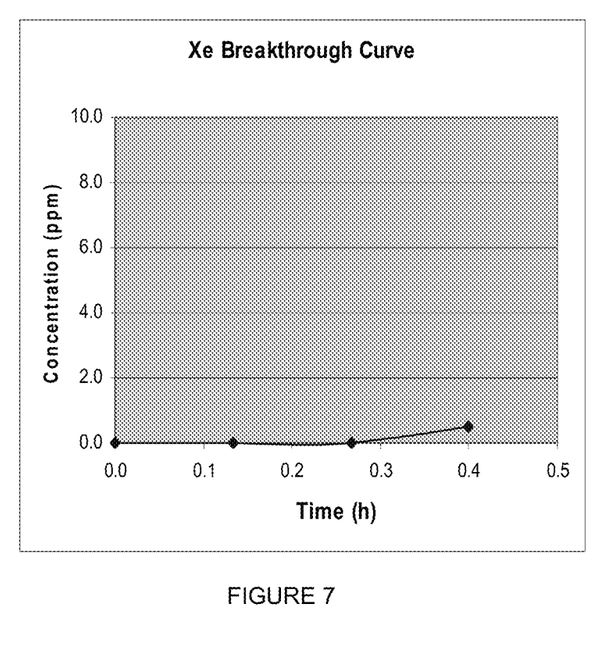
FIG. 7 is the breakthrough curve for xenon in MIL 53 at 22° C.

FIG. 7 is the breakthrough curve for xenon at 22° C. The breakthrough time for xenon was 0.27 hours.

Figure 8:
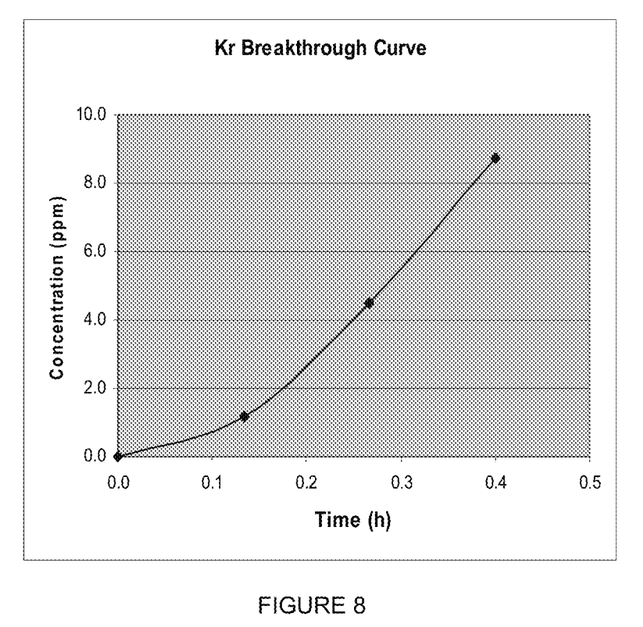
FIG. 8 is the breakthrough curve for krypton in MIL 53 at –26° C.

FIG. 8 is the breakthrough curve for krypton at −26° C. The breakthrough time for krypton was 0 hours.

Figure 9:
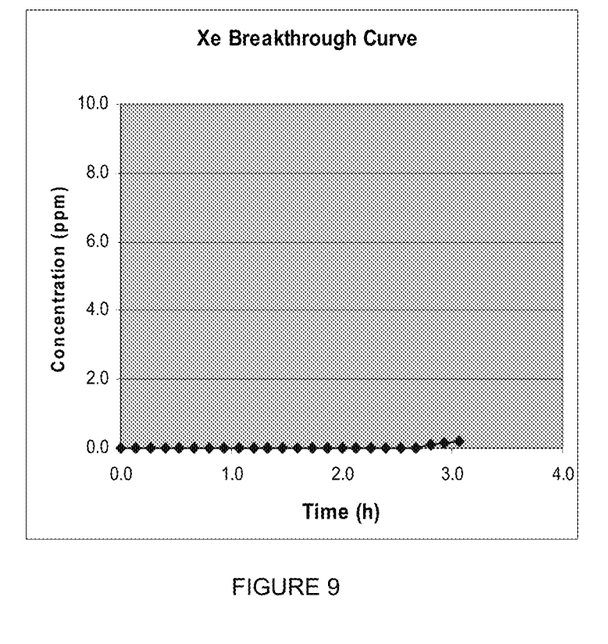
FIG. 9 is the breakthrough curve for xenon in MIL 53 at –26° C.

FIG. 9 is the breakthrough curve for xenon at −26° C. The breakthrough time for xenon was 2.75 hours.

Based on these results, MIL 53 adsorbs xenon better at lower temperatures, but does not absorb krypton and xenon as well as Cu-BTC at either temperature.

Example 3

Example 1 was repeated with a gaseous mixture containing argon, 1 ppm krypton, and 1 ppm xenon. As stated previously, other impurities may be present in the gaseous mixture. At 22° C., the breakthrough time for krypton and xenon was 0 hours. At −26° C., the breakthrough time for krypton was 1 hour and for xenon was 3.5 hours. Applicants theorize that, as this testing was performed subsequent to testing the 10 ppm samples, that the adsorbent material may have been contaminated or improperly regenerated. For example, it is possible that during regeneration, channels were formed in the MOF adsorbent. Alternatively, Applicants theorize that the vapor pressure of the krypton and xenon impurities at room temperature may be too low for adsorption at the 1 ppm concentration. Alternatively, Applicants theorize that the detection limits of the analytical equipment may be too close to the lower limits of the calibration curve to differentiate baseline noise from actual results. In any event, at the lower temperature, the Cu-BTC was capable of adsorbing the impurities.

Example 4

The ability of the MOF to remove low levels of krypton from argon was tested. The test gas was argon containing 3 ppm krypton.

The cartridge included a 250 ml sample cylinder (dimensions: 1" ID×8" in length), two Bulkhead Male Connectors (¼ in. Tube OD×¼ in. Male NPT) and two 10 micron disk filters (Mott Corp.) molded on the NPT ends of the male connectors (FIG. 1). Basolite C300 adsorbent ($Cu_3BTC_2$) was filled in the cartridge between the two filters. The Basolite C300 MOF has a superficial density of 0.35 g/ml, and an estimate free volume fraction of 31%. During the experimentation, the cartridge temperature was maintained with a cold bath achieved by mixing crushed dry ice and acetone.

Before breakthrough study, the basolite C300-containing cartridge needed to be activated in an oven under temperature programming where the initial temperature of 22° C. was raised to 200° C. with a 2° C./min temperature ramp rate. The 200° C. temperature was held for 16 hours under vacuum condition with nitrogen purge. All the chosen materials were then regenerated in a 200° C. oven over night under a 500 ml/min flow of house nitrogen or helium.

Figure 10:
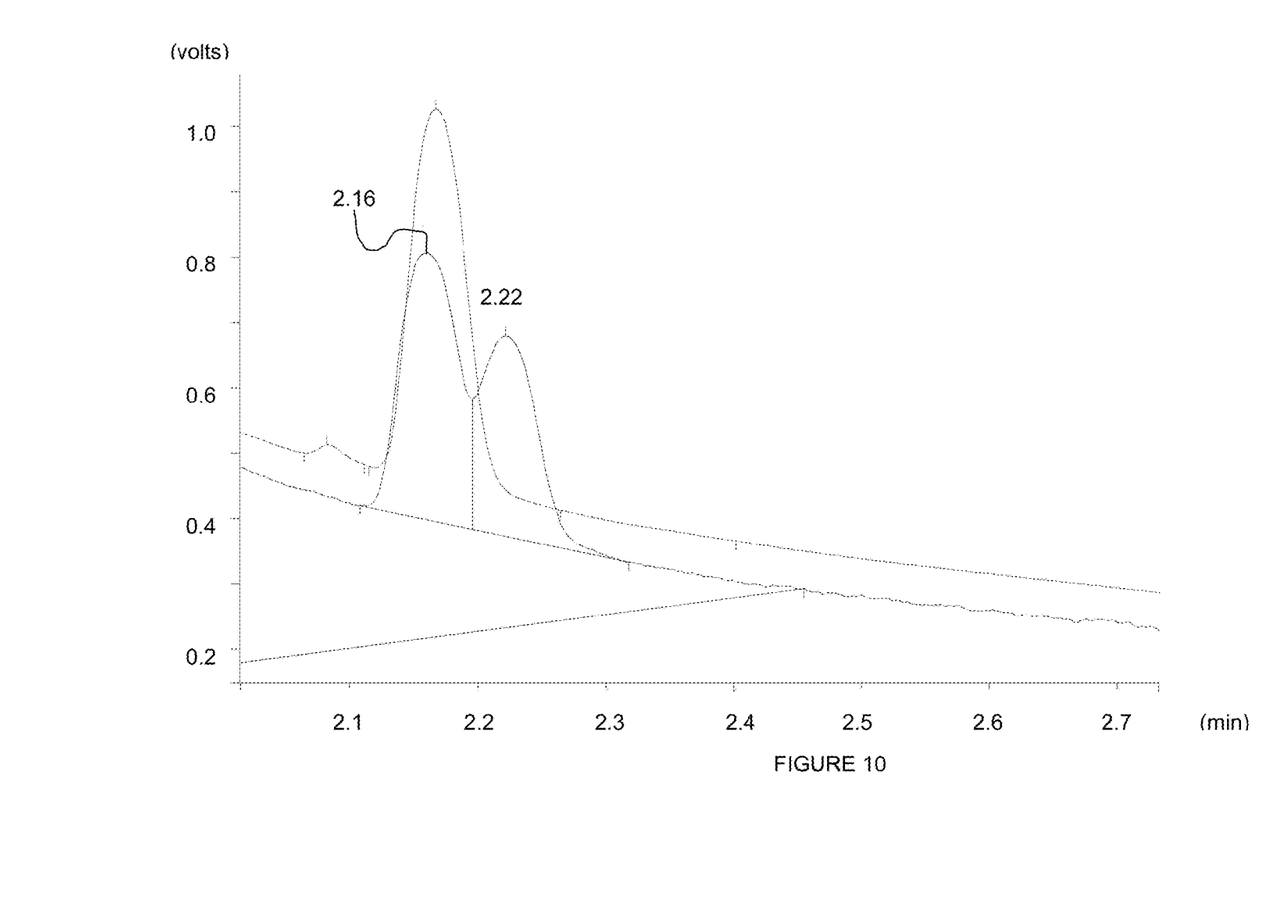
FIG. 10 is a chromatogram of a krypton-containing argon gas before and after purification with the MOF.

The experimentation was carried out with a Varian CP-3800 Gas Chromatograph coupled with a PDHID detector. The operating conditions are as below:

Column: plot molecular sieve 5A 30 m×0.53 mm I.D.
Oven: Initial temp: 40° C., then ramp up to 120° C.@25° C. hold for 2 min
Carrier gas: Helium@4 ml/min
PDHID: helium 35 ml/min; 140° C.
Pressure: 100 psi
Cartridge Temperature: −78° C., crushed dry ice/acetone slurry
Flow rates: 1 L/min, 2.5 L/min, 5 L/min and 20 L/min
Cartridge size: 60 g Cu-MOF The test gas was allowed to flow directly from the cylinder through the gas chromatograph in order to obtain a reference chromatogram. The test gas was then allowed to flow through the MOF and a chromatogram obtained. The two chromatograms are shown in FIG. 10 where the lower baseline and associated peaks are from the test gas without going through the MOF cartridge and the upper baseline and associated peaks are from the test gas after it has been allowed to flow through the MOF. As seen in the chromatogram with the lower baseline, two peaks show up at 2.16 and 2.22 minutes corresponding to nitrogen and krypton, respectively. As seen in the chromatogram with the upper baseline, while the nitrogen peak is still present and a smaller peak corresponding to oxygen appears before the nitrogen peak, the krypton peak is no longer present. Thus, the krypton appears to have been removed to an extent lower than the measurement threshold.

The breakthrough studies were performed at a pressure of 100 psi and at a temperature of −78° C. The experiment was run three times under each operating condition to check the repeatability. The cartridge was regenerated after each usage. Very good repeatability was observed in terms of breakthrough time.

Four flow rates (1 L/min, 2.5 L/min, 5 L/min and 20 L/min) were chosen for breakthrough and adsorption capacity study. The breakthrough times and adsorption capacities are listed in Table 1.

TABLE 1

| | Breakthrough times/adsorption capacities at different flow rates | | | | | | | |
|---|---|---|---|---|---|---|---|---|
| | −78° C. | | | | | | | |
| | Kr breakthrough time (h) | | | | Kr Capacity (mg/g) | | | |
| Material | 1 L/m | 2.5 L/m | 5 L/m | 20 L/m | 1 L/m | 2.5 L/m | 5 L/m | 20 L/m |
| Basolite C300 (46 g) | 1.5 | 1 | 0.3 | 0 | 0.01 | 0.03 | 0.02 | 0 |

The results in the table show that the 2.5 L/min flow results in the highest adsorption capacity. At higher flow rates, the break through time was faster indicating that mass transfer had some role. Above 2.5 l/min the capacity also decreases as flow rate increases It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of removing krypton and/or xenon impurities from an argon gaseous mixture, said method comprising the steps of:
    (a) obtaining an argon gaseous mixture comprising argon and impurities of krypton and/or xenon;
    (b) flowing the mixture through a cartridge containing one or more adsorbents made of a metal organic framework (MOF); and
    (c) producing purified argon from the cartridge,
    wherein the argon gaseous mixture has an argon concentration of at least 99% v/v,
    wherein the purified argon produced in step (c) has a krypton concentration of less that or equal to 0.5 ppm krypton w/w and/or a xenon concentration of less that or equal to 0.25 ppm w/w, and
    wherein the temperature of the MOF is between −26 degrees C and −200 degrees C.

2. The method of claim 1, further comprising, prior to step (b), the step of activating the one or more MOF adsorbents.

3. The method of claim 1, wherein the one or more MOF adsorbents is $Cu_3(BTC)_2$, where BTC is benzene-1,3,5-tricarboxylate.

4. The method of claim 1, wherein the argon gaseous mixture has an argon concentration of at least 99.9% v/v.

5. The method of claim 1, wherein the argon gaseous mixture has an argon concentration of at least 99.99% v/v.

6. The method of claim 1, wherein step (b) is performed at a pressure of about 100 psi.

7. The method of claim 6, wherein the argon gaseous mixture flows through the cartridge at a flow rate of about 500 mL per minute.

* * * * *